(12) United States Patent
Yu et al.

(10) Patent No.: US 11,389,853 B2
(45) Date of Patent: Jul. 19, 2022

(54) DEVICE AND METHOD FOR FORMING METAL PLATE BY USING HIGH-ENERGY ELECTRIC PULSE TO DRIVE ENERGETIC MATERIALS

(71) Applicant: Harbin Institute of Technology, Heilongjiang (CN)

(72) Inventors: Haiping Yu, Harbin (CN); Xueyun Xie, Harbin (CN)

(73) Assignee: Harbin Institute of Technology, Harbin (CN)

( * ) Notice: Subject to any disclaimer, the term of this patent is extended or adjusted under 35 U.S.C. 154(b) by 119 days.

(21) Appl. No.: 16/831,021

(22) Filed: Mar. 26, 2020

(65) Prior Publication Data
US 2021/0187579 A1    Jun. 24, 2021

(30) Foreign Application Priority Data
Dec. 18, 2019  (CN) .......................... 201911307468.4

(51) Int. Cl.
*B21D 26/12*  (2006.01)
*B21D 26/021* (2011.01)
(Continued)

(52) U.S. Cl.
CPC .......... *B21D 26/12* (2013.01); *B21D 26/021* (2013.01); *B21D 37/12* (2013.01); *B21D 37/14* (2013.01);
(Continued)

(58) Field of Classification Search
CPC ........ B21D 26/06; B21D 26/10; B21D 26/12; B21D 37/10; B21D 37/12; B21D 26/08; B23K 11/309; B23K 35/02; B23K 35/22
(Continued)

(56) References Cited

U.S. PATENT DOCUMENTS

| 3,222,902 A | * | 12/1965 | Brejcha | ................... | B21D 26/12 |
| | | | | | 72/56 |
| 3,322,515 A | * | 5/1967 | Dittrich | ..................... | C23C 4/00 |
| | | | | | 149/5 |
| 4,081,982 A | * | 4/1978 | Minin | .................... | B21D 26/08 |
| | | | | | 29/421.2 |
| 7,516,634 B1 | * | 4/2009 | Golovashchenko | ... | B21D 26/12 |
| | | | | | 29/419.2 |

(Continued)

OTHER PUBLICATIONS

The Machinery's Handbook, 27th Ed, p. 1349, "Electric Discharge Machining" (Year: 2004).*
Jergens Spring Loaded Devices, p. 17 of 18, Application Ideas (Year: 2010).*

*Primary Examiner* — Adam J Eiseman
*Assistant Examiner* — Fred C Hammers
(74) *Attorney, Agent, or Firm* — Carlson, Gaskey & Olds, P.C.

(57) ABSTRACT

The present disclosure discloses a device and a method for forming a metal plate by using a high-energy electric pulse to drive an energetic material. The device includes high-energy pulse discharge equipment, an intelligent robot arm control system, a vacuum pumping device, a hydraulic press, a forming die, positive and negative electrodes, an energetic rod, and liquid supply equipment. According to the present disclosure, energy of a metal wire is added to energy of an energetic material after energy release to implement high-rate forming of the plate. A discharge voltage of the high-energy pulse discharge equipment is reduced and a service life thereof is prolonged. The discharge equipment is triggered by the manufactured small-size electric pulse metal wire, thereby reducing a volume and costs of the equipment and miniaturizing the equipment to implement precise operating, forming, and intelligent integration with the robot arm control system.

11 Claims, 4 Drawing Sheets

(51) Int. Cl.
- *B21D 37/12* (2006.01)
- *B21D 37/14* (2006.01)
- *B21D 37/16* (2006.01)
- *B23H 1/02* (2006.01)
- *B23H 1/08* (2006.01)
- *B25J 11/00* (2006.01)

(52) U.S. Cl.
CPC ............. *B21D 37/16* (2013.01); *B23H 1/022* (2013.01); *B23H 1/08* (2013.01); *B25J 11/005* (2013.01)

(58) Field of Classification Search
USPC ........................................................ 72/54, 56
See application file for complete search history.

(56) References Cited

U.S. PATENT DOCUMENTS

| | | |
|---|---|---|
| 2009/0272168 A1* | 11/2009 | Golovashchenko ........................ B21D 26/027 72/60 |
| 2011/0067468 A1* | 3/2011 | Golovashchenko ... B21D 37/10 72/57 |
| 2014/0053622 A1* | 2/2014 | Bonnen .................. B21D 26/12 72/55 |
| 2019/0019446 A1* | 1/2019 | Zhang ...................... G09G 3/36 |
| 2019/0247919 A1* | 8/2019 | Kim ........................... B22F 9/24 |
| 2021/0381090 A1* | 12/2021 | Meyer .................... B21D 26/08 |

* cited by examiner

DEVICE AND METHOD FOR FORMING METAL PLATE BY USING HIGH-ENERGY ELECTRIC PULSE TO DRIVE ENERGETIC MATERIALS

CROSS-REFERENCE TO RELATED APPLICATION

This application claims priority to Chinese Patent Application No. 201911307468.4, which was filed 18 Dec. 2019 and is incorporated herein by reference in its entirety.

TECHNICAL FIELD

The present disclosure relates to the technical field of plastic forming of a metal plate, and in particular, to a device and a method for forming a metal plate by using a high-energy electric pulse to drive energetic materials (EMs).

BACKGROUND

The development of intelligent and high-end manufacturing imposes increasingly higher technical requirements on complex parts, especially on production and manufacturing of some difficult-to-form metal materials (such as aluminum alloy 7A09, aluminum alloy 2024, magnesium alloy AZ31, and titanium alloy TC4) at room temperature. Due to poor formability of the difficult-to-form materials, it is difficult to form parts with complex shapes at room temperature. Although formability of metal plates can be improved during heating, the working process takes a long time and high costs, which is not conducive to actual production and manufacturing. Thus, it is difficult to implement intelligent automatic production. Explosive forming, electrohydraulic forming, and electromagnetic forming are high-rate forming methods for significantly improving a plastic deformation ability of metal. In comparison with a traditional forming method, high-rate forming can be used with a simple die structure, short forming time, and low costs. However, explosive forming is greatly limited by safety of explosive storage and process implementation. Electrohydraulic forming can improve a forming limit and a plastic deformation ability of materials. However, when a difficult-to-deform plate has a large deformation area and requires a large local deformation, discharge energy of traditional electrohydraulic forming cannot meet the requirements, resulting in a small degree of deformation and low forming precision of the complex parts. Thus, actual technical requirements of the product cannot be met. The discharge energy can be increased by increasing a discharge voltage, but a discharge loop current sharply increases if the voltage is blindly increased. Consequently, equipment works in a high load state, safety of the discharge process is reduced, and a service life of the equipment is shortened. Although electromagnetic forming belongs to high-rate forming, electromagnetic forming can be applied to only high-conductivity plates (such as aluminum alloy and copper alloy), and also encounters problems of uneven distribution of electromagnetic force and poor modeling of small fillets. In addition, different parts require corresponding coils during forming due to poor applicability of the coils, thereby increasing costs.

SUMMARY

The present disclosure provides exemplary devices and exemplary methods for forming a metal plate by using a high-energy electric pulse to drive energetic materials (EMs), to resolve the problems in the prior art. Embodiments of the disclosure effectively combines electrohydraulic forming with EMs to achieve energy level spanning, thereby reducing a discharge voltage of high energy electric pulse forming system and prolonging a service life of the equipment. In addition, the exemplary embodiments can precisely form a difficult-to-form metal plate at room temperature, so that intelligent manufacturing is easily implemented.

To achieve the above purpose, the present disclosure provides the following technical solutions: a method for forming a metal plate by using a high-energy electric pulse to drive energetic materials (EMs), applied to a device for forming the metal plate by using the high-energy electric pulse to drive the EMs is provided, the device comprising: an upper die, a lower die, and a high energy electric pulse forming system, where the upper die comprises an upper die plate, a concave mold, and a die fixing plate, the lower die comprises a lower die plate, a liquid storage chamber, and a liquid chamber fixing plate, the concave mold is fixed on the upper die plate through the die fixing plate, and the concave mold is provided with an exhaust vent connected to an external vacuum pump; the liquid storage chamber is fixed on the liquid chamber fixing plate, the liquid chamber fixing plate is fixed on the lower die plate, a cross section of a side wall of the liquid storage chamber is circular, positive and negative electrodes are fixed and assembled on a first location and a second location of the side wall of the liquid storage chamber which are centrosymmetric, respectively; the liquid storage chamber is connected to a liquid supply equipment, and an energetic rod is arranged between the positive and negative electrodes, the positive and negative electrodes are connected to the high energy electric pulse forming system; and the upper die plate and the lower die plate are fitted and mounted through a guide sleeve and a guide post; wherein the method comprises the following steps:

step 1: packing the EMs into an insulation tube, and sealing two ends of the insulation tube through gluing by an end plug to form the energetic rod; wherein a diameter of a metal wire in the energetic rod is 0.1-1.0 mm and an effective discharge length is 20-200 mm; and the EMs are formed by mixing two or more of aluminum powder, ammonium nitrate, ammonium perchlorate, copper oxide, polytetrafluoroethylene, and nickel powder; programming a robot arm to place the energetic rod between the positive and negative electrodes, wherein a pinball device at an electrode terminal of each of the positive and negative electrodes locks the metal wire at two ends of the energetic rod; and using the robot arm to clamp a metal plate and place the metal plate in the liquid storage chamber, wherein a first sealing ring is used between the metal plate and the liquid storage chamber for sealing;

step 2: fixing the liquid storage chamber on the liquid chamber fixing plate, and fixing the liquid chamber fixing plate on the lower die plate through a fastening bolt, fitting and mounting the upper die plate and the lower die plate through the guide sleeve and the guide post, and presetting a die clamping force for the upper die and the lower die by using a hydraulic press;

step 3: checking a first connection status between the external vacuum pump and the concave mold, checking a second connection status between a liquid filling interface and the liquid supply equipment, checking a third connection status between the high energy electric pulse forming system and positive electrode of the positive and negative electrodes, and checking a fourth connection status between the high energy electric pulse forming system and negative electrode of the positive and negative electrodes;

step 4: starting the external vacuum pump such that a forming concave mold cavity of the concave mold is in a certain vacuum state;

step 5: opening the liquid supply equipment to fill the liquid storage chamber with liquid through the liquid filling interface;

step 6: checking a fifth connection status of a line, and if the line is "on", performing electric discharging;

step 7: closing a charging switch such that a high-voltage charging power source charges a discharge capacitor bank through a high-voltage rectifier and a current limiting resistor, and after a preset voltage is reached, opening the charging switch, and opening a discharge trigger signal source to control an auxiliary discharge gap to discharge the energetic rod;

step 8: after the discharge is completed, opening a drain interface to recover the liquid; and step 9: starting the hydraulic press for separating the upper die and the lower die, and using the robot arm to pick, so as to form the entire plate.

Preferably, the method comprises: mounting the guide sleeve on the upper die plate through interference fit, mounting the guide post on the lower die plate through interference fit, fitting the guide sleeve mounted on the upper die plate with the guide post mounted on the lower die plate, and adopting clearance fit between the guide post and the guide sleeve.

Preferably, the method comprises: placing the metal plate in a recessed sub-port of the concave mold.

Preferably, the method comprises: mounting an insulation sleeve outside each of the positive and negative electrodes, and fixing the insulation sleeve in a threaded hole on a corresponding one of the first location and the second location of the liquid storage chamber through a threaded steel sleeve that is threadedly connected with the threaded hole, wherein the liquid storage chamber is in a stepped shape.

Preferably, the method comprises: providing a first sealing ring at a first contact area between the concave mold and the liquid storage chamber, providing a second sealing ring at a second contact area between the insulation sleeve and the threaded steel sleeve, and providing a third sealing ring at a third contact area between the insulation sleeve and the liquid storage chamber.

Preferably, step 2 further comprises: mounting the upper die and the lower die on the hydraulic press, supplying liquid, in the form of water, during the entire forming process using the liquid supply equipment, wherein liquid in the liquid storage chamber is filtered by flowing into an effluent treatment system, through the drain interface, and then flows into the liquid supply equipment; and the liquid supply equipment in step 3 is filled with the liquid and a volume of the liquid is the same as a volume of the liquid storage chamber; and a parameter selection range of the high energy electric pulse forming system is: a discharge capacitance is 1-2000 µF, and a discharge voltage is 1-30 kV.

Preferably, step 2 further comprises: mounting the upper die and the lower die on the hydraulic press, supplying liquid, in the form of water, during the entire forming process using the liquid supply equipment, wherein liquid in the liquid storage chamber is filtered by flowing into an effluent treatment system, through the drain interface, and then flows into the liquid supply equipment; and the liquid supply equipment in step 3 is filled with the liquid and a volume of the liquid is the same as a volume of the liquid storage chamber; and a parameter selection range of the high energy electric pulse forming system is: a discharge capacitance is 1-2000 µF, and a discharge voltage is 1-30 kV.

Preferably, step 2 further comprises: mounting the upper die and the lower die on the hydraulic press, supplying liquid, in the form of water, during the entire forming process using the liquid supply equipment, wherein liquid in the liquid storage chamber is filtered by flowing into an effluent treatment system, through the drain interface, and then flows into the liquid supply equipment; and the liquid supply equipment in step 3 is filled with the liquid and a volume of the liquid is the same as a volume of the liquid storage chamber; and a parameter selection range of the high energy electric pulse forming system is: a discharge capacitance is 1-2000 µF, and a discharge voltage is 1-30 kV.

Preferably, step 7 further comprises: charging the discharge capacitor bank to the preset voltage, opening the discharge trigger signal source to control the auxiliary discharge gap such that a high-energy pulse current flows into the metal wire through the positive and negative electrodes, the metal wire is charged with electricity under the action of the high-energy pulse current and is instantaneously heated up, melted, and vaporized to generate plasma, and the plasma quickly enters gaps between particles of the EMs to ignite and then trigger the EMs to release energy; the metal wire explodes and the EMs releases energy and generates a powerful shock wave, and thermal energy to act on the liquid, and after high kinetic energy is obtained, the high kinetic energy acts on the metal plate to complete plastic forming of the metal plate.

Preferably, step 7 further comprises: charging the discharge capacitor bank to a preset voltage, opening the discharge trigger signal source to control the auxiliary discharge gap such that a high-energy pulse current flows into the metal wire through the positive and negative electrodes, the metal wire is charged with electricity under the action of the high-energy pulse current and is instantaneously heated up, melted, and vaporized to generate plasma, and the plasma quickly enters gaps between particles of the EMs to ignite and then trigger the EMs to release energy; the metal wire explodes and the EMs releases energy and generates a powerful shock wave, and thermal energy to act on the liquid, and after high kinetic energy is obtained, the high kinetic energy acts on the metal plate to complete plastic forming of the metal plate.

Preferably, step 7 further comprises: charging the discharge capacitor bank to a preset voltage, opening the discharge trigger signal source to control the auxiliary discharge gap such that a high-energy pulse current flows into the metal wire through the positive and negative electrodes, the metal wire is charged with electricity under the action of the high-energy pulse current and is instantaneously heated up, melted, and vaporized to generate plasma, and the plasma quickly enters gaps between particles of the EMs to ignite and then trigger the EMs to release energy; the metal wire explodes and the EMs releases energy and generates a powerful shock wave, and thermal energy to act on the liquid, and after high kinetic energy is obtained, the high kinetic energy acts on the metal plate to complete plastic forming of the metal plate.

The present disclosure achieves the following technical effects compared with the prior art:

The present disclosure provides a technology for precisely forming a difficult-to-form metal plate by coupling a metal wire with EMs. Therefore, embodiments of the present disclosure resolves problems of uneven distribution of magnetic field force and poor coil applicability in traditional electromagnetic forming; and overcomes disadvantages of traditional electrohydraulic forming and energy release (application) of EMs.

Disadvantages of electrohydraulic forming: An energy level of equipment can be increased by increasing a discharge voltage. However, when higher energy is required, an excessive voltage causes an energy storage capacitance of the equipment to increase and a discharge loop current to increase, and the equipment is in high load. Thus, testing risk is increased and a service life of the equipment is shortened. Disadvantages in application of the EMs: Traditional EMs (such as explosives) have a high energy level and are dangerous, and therefore cannot be promoted due to restrictions on a working place, test conditions, and safety. In the present disclosure, advantages of electrohydraulic forming are employed. As an energy transfer medium, water is green, environmentally friendly, clean, and easy to clean and recycle. Because water is incompressible, after the water is applied to forming of parts, the workpiece is of good surface quality, no obvious scratches, a good modeling effect, no lubrication, simple tooling, a short cycle, and a high level of automation.

In the present disclosure, energy of a metal wire is added to energy of EMs after energy release, which is a new high-rate forming technology for a difficult-to-form metal plate to implement high-rate forming of materials. A small-dose, safe, and controllable energetic rod is manufactured, and energy release is triggered through the low-voltage metal wire to achieve energy level spanning, so that the equipment is safe and controllable. The two kinds of energy can work jointly to achieve high-rate forming, thereby improving forming precision and a plastic deformation ability of the difficult-to-form plate. In addition, embodiments of the present disclosure belong to the field of electrohydraulic forming, and is not limited by material conductivity. Therefore, complex environmentally-friendly parts of small springback, high dying precision, and high surface precision can be formed without requiring lubrication, and automated manufacturing can be implemented. This is a new technology with great development potential.

BRIEF DESCRIPTION OF THE DRAWINGS

To describe the technical solutions in the embodiments of the present invention or in the prior art more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

1. Vacuum pump; 2. Upper die plate; 3. Guide sleeve; 4. Guide post; 5. Die fixing plate; 6. Fastening bolt; 7. Concave mold; 8. Metal plate; 9. First sealing ring; 10. Liquid filling interface; 11. Negative electrode; 12. Liquid storage chamber; 13. Liquid chamber fixing plate; 14. Lower die plate; 15. Energetic rod; 15-1. End plug; 15-2. Metal wire; 15-3. EMs; 15-4. Insulation tube; 16. Drain interface; 17. Insulation sleeve; 18. Second sealing ring; 19. Third sealing ring; 20. Positive electrode; 21. Threaded steel sleeve; 22. Discharge trigger signal source; 23. Auxiliary discharge gap; 24. Discharge capacitor bank; 25. Charging switch; 26. Current limiting resistor; 27. High-voltage rectifier; 28. High-voltage charging power source; 29. Robot arm; 30. Exhaust vent; 31. Forming concave mold cavity; 32. Upper die; 33. Threaded hole; 34. Line; 35. High energy electric pulse forming system; 36. Hydraulic press; 37. Lower die; 38. Effluent treatment system; 39. Liquid supply equipment; 40. Bulge; 41. Double-layer drawing box.

DETAILED DESCRIPTION

The following clearly and completely describes the technical solutions in the embodiments of the present disclosure with reference to accompanying drawings in the embodiments of the present disclosure. The described embodiments are merely a part rather than all of the embodiments of the present invention. All other embodiments obtained by a person of ordinary skill in the art based on the embodiments of the present invention without creative efforts shall fall within the protection scope of the present invention.

The present disclosure provides a device and a method for forming a metal plate by using a high-energy electric pulse to drive EMs, to resolve the problems in the prior art. Therefore, electrohydraulic forming is effectively combined with EMs to achieve energy level spanning, thereby reducing a discharge voltage of high energy electric pulse forming system 35 and prolonging a service life of the equipment. In addition, a difficult-to-form metal plate can be precisely formed at room temperature, so that intelligent manufacturing is easily implemented.

In order to make the above objects, features, and advantages of the present disclosure more apparent, the present disclosure will be further described in detail in connection with the accompanying drawings and the detailed description.

Figure 1:
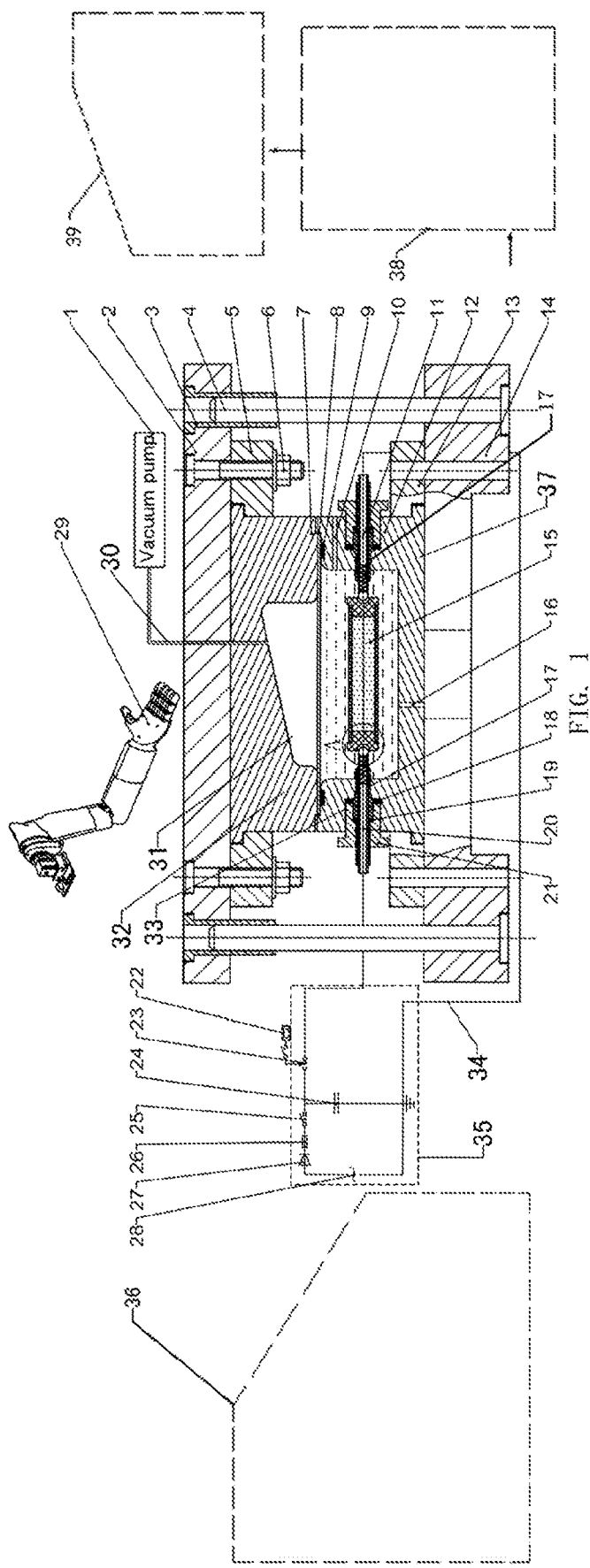
FIG. 1 is a schematic diagram of a device for forming a metal plate by using a high-energy electric pulse to drive EMs.
Figure 2:
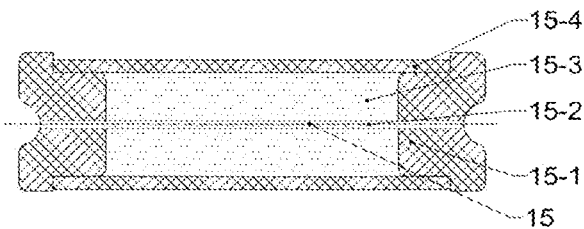
FIG. 2 is a schematic overall diagram of an energetic rod.
Figure 3:
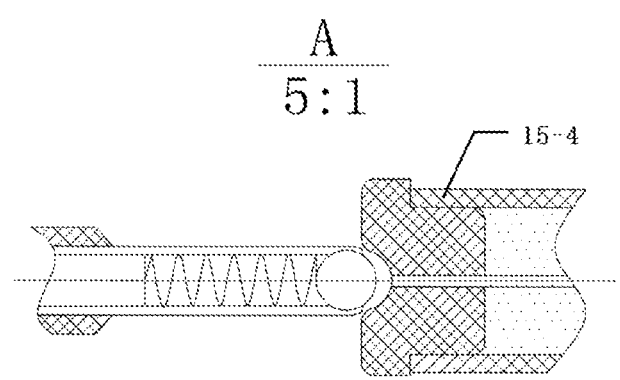
FIG. 3 is a partial enlarged view of a junction between an energetic rod and an electrode.
Figure 4:
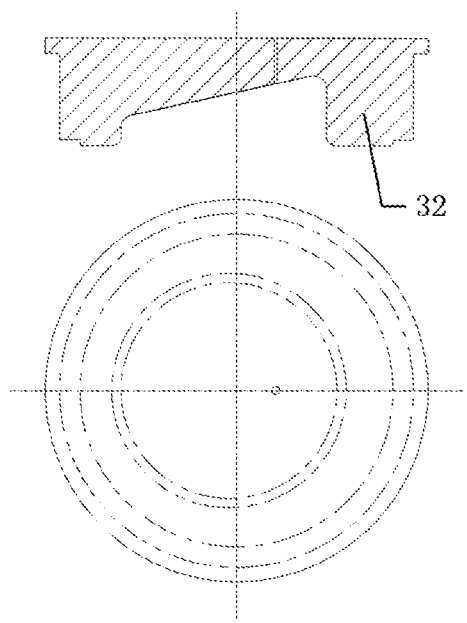
FIG. 4 is a front view and a top view of a die.
Figure 5:
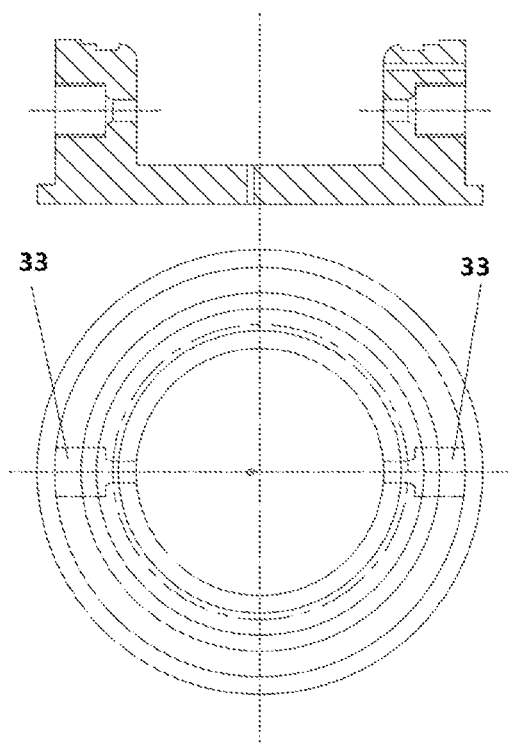
FIG. 5 is a front view and a top view of a liquid storage chamber.
Figure 6:
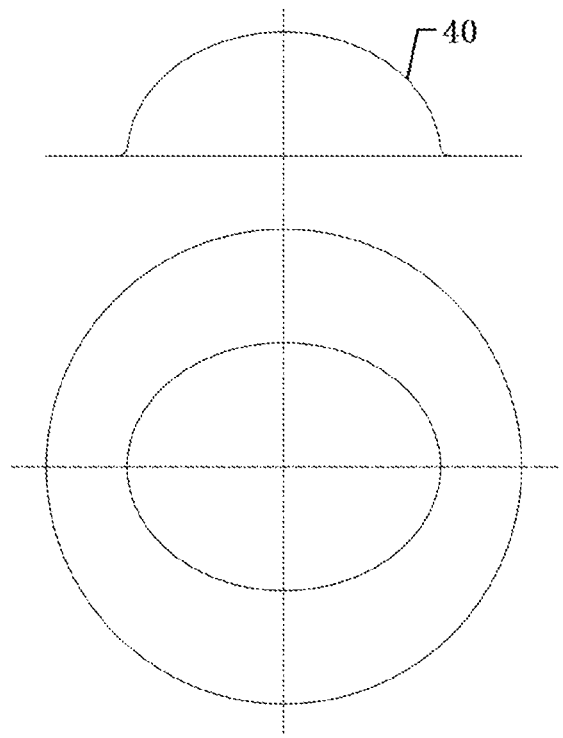
FIG. 6 is a front view and a top view of a bulge on an outer door handle.
Figure 7:
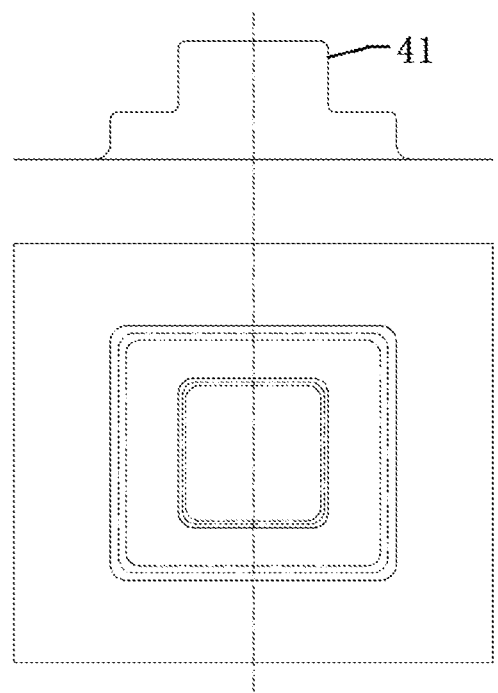
FIG. 7 is a front view and a top view of a double-layer drawing box of an aluminium alloy plate.

As shown in FIG. 1 to FIG. 7, the present disclosure provides a device for forming a metal plate by using a high-energy electric pulse to drive EMs, including a forming die, high energy electric pulse forming system, an robot arm 29, a vacuum pumping device, a hydraulic press 36, and liquid supply equipment 39.

The forming die is divided into an upper die 32 and a lower die 37. The upper die 32 includes an upper die plate 2, a concave mold 7, a die fixing plate 5, a fastening bolt 6, a vacuum pump 1, and a guide sleeve 3. The lower die 37 includes a lower die plate 14, a liquid chamber fixing plate 13, a liquid storage chamber 12, a first sealing ring 9, a fastening bolt 6, a positive electrode 20, a negative electrode 11, an insulation sleeve 17, second and third sealing rings, a threaded steel sleeve 21, a liquid filling interface 10, a drain interface 16, liquid water, a guide post 4, and an energetic rod 15.

The concave mold 7 of the die is a forming cavity of a metal plate 8. The concave mold 7 is fixed on the upper die plate 2 by the fastening bolt 6 through the die fixing plate 5. The guide sleeve 3 mounted on the upper die plate 2 is fitted with the guide post 4 mounted on the lower die plate 14 to perform guiding, thereby ensuring position precision of the upper die 32 and the lower die 37. A mounting standard is that the guide sleeve 3 is mounted on the upper die plate 2 through interference fit, the guide post 4 is mounted on the lower die plate 14 through interference fit, and clearance fit is adopted between the guide sleeve 3 and the guide post 4. In addition, the concave mold 7 is provided with an exhaust vent 30 and is connected to the external vacuum pump 1 to evacuate the concave mold 7. The difficult-to-form metal plate 8 is placed in a recessed sub-port of the concave mold 7, and the first sealing ring 9 between the concave mold 7 and the liquid storage chamber 12 performs a water medium sealing function. When the hydraulic press 36 provides a certain die clamping force, an annular area corresponding to the liquid storage chamber and the concave mold 7 serves as a blank holder to control plastic deformation.

The liquid storage chamber 12 is connected to the liquid supply equipment 39 through the liquid filling interface 10. The liquid storage chamber 12 is in a stepped shape and is fixed on the liquid chamber fixing plate 13 through steps. The liquid chamber fixing plate 13 is fixed on the lower die plate 14 through the fastening bolt 6. Threaded holes are preset on two sides of the liquid storage chamber 12, a cross section of a side wall of the liquid storage chamber is circular, and the positive and negative electrodes are fixedly assembled on a first location and a second location of the side wall of the liquid storage chamber which are centrosymmetric, respectively. One of the insulation sleeves 17 is mounted outside the positive electrode, and is fixed in the corresponding threaded hole on a side wall of the liquid storage chamber 12 through the threaded steel sleeve 21 that is threadedly connected with the threaded hole. Another one of the insulation sleeves 17 is mounted outside the negative electrode, and is fixed in the corresponding threaded hole on the side wall of the liquid storage chamber 12 through another threaded steel sleeve 21 that is threadedly connected with this threaded hole, the function of the insulation sleeves 17 is to isolate the positive and negative electrodes from the liquid storage chamber 12 and protect against undesired static electricity. To ensure a sealing effect, contact portions between the steel sleeve, the insulation sleeves 17, and the liquid storage chamber 12 are provided with the second and third sealing rings. A pinball device is arranged at terminals of the positive and negative electrodes for locking an end of a metal wire 15-2 at two ends of the energetic rod 15 placed by a robot arm. The positive and negative electrodes are connected to a high energy electric pulse forming system through a lead-out wire outside the liquid storage chamber.

A diameter of the metal wire 15-2 in the energetic rod 15 is 0.1-1.0 mm and an effective discharge length is 20-200 mm Prepared EMs 15-3 are packed into an insulation tube of a certain length, and two ends are sealed through gluing by an end plug 15-1. The pinball device is mounted in a discharge portion of the positive and negative electrodes (the positive and negative electrodes are provided with a cylindrical straight hole with a depth of 3 cm) and mainly includes a spring, a metal ball, and a threaded ferrule. One end of the spring is connected to the metal ball through welding, and the connected spring and ball are placed in the cylindrical straight hole at the ends of the positive and negative electrodes and then are screwed into the electrode terminals through the threaded ferrule (with an internal thread) to fix the ball (the spring has a certain amount of compression in this case) to manufacture the pinball device. Working principle of the pinball device: When the energetic rod 15 is placed by the robot arm, after arc grooves at two ends of the energetic rod 15 is in contact with the metal ball at the positive and negative electrodes, the metal ball is pressed to compress the spring to contract. When the energetic rod 15 is placed on a central axis of the positive and negative electrodes, the metal ball locks the energetic rod 15 under the action of elastic potential energy of the spring.

A method for forming a metal plate 8 of EMs 15-3 driven by a high-energy electric pulse includes the following steps:

Step 1: Program an robot arm to place an energetic rod 15 between positive and negative electrodes, where a pinball device at two electrode terminals locks a metal wire 15-2 at two ends of the energetic rod 15; and use the robot arm to clamp the metal plate 8 and place the metal plate 8 in the liquid storage chamber 12, where a first sealing ring 9 is used between the metal plate 8 and the liquid storage chamber 12 for sealing.

Step 2: Perform die fixing by using a die fixing plate 5 and a liquid chamber fixing plate 13 through a fastening bolt 6, perform die assembling by using an upper die plate 2 and a lower die plate 14 through a guide post 4 and a guide sleeve 3, and preset a certain die clamping force for a die by using a hydraulic press 36.

Step 3: Check a connection status between a vacuum pump 1 and a concave mold 7, a connection status between a liquid filling interface 10 and liquid supply equipment 39, and a connection status between a discharge electrode and high energy electric pulse forming system.

Step 4: Start the vacuum pump 1 such that a forming concave mold cavity 31 of the concave mold 7 is in a certain vacuum state.

Step 5: Open the liquid supply equipment 39 to fill the liquid storage chamber 12 with a certain amount of liquid through the liquid filling interface 10.

Step 6: Check a connection status of a line 34 using a multimeter, and if the line 34 is "on", perform electric discharging.

Step 7: Close a charging switch 25 such that a high-voltage charging power source charges a discharge capacitor bank 24 through a high-voltage rectifier 27 and a current limiting resistor 26, and after a preset voltage is reached, open the charging switch 25, and open a discharge trigger signal source 22 to control an auxiliary discharge gap 23 to discharge the energetic rod 15.

Step 8: After the discharge is completed, open a drain interface 16 to recover liquid.

Step 9: Start the hydraulic press 36 for separating the upper die and the lower die, and perform picking by the robot arm.

The positive and negative electrodes in step 1 are provided with external threads. The insulation sleeve 17 and the electrode are fixed through screw connection and interference fit. The electrode and the insulation sleeve 17 are fixed on the liquid storage chamber 12 through a threaded steel sleeve 21, and a contact area between the steel sleeve and the insulation sleeve 17 is provided with a second sealing ring 18 and a third sealing ring 19 to seal liquid in the liquid storage chamber 12. The energetic rod 15 in step 1 mainly includes the EMs 15-3, the metal wire 15-2, an insulation tube 15-4, and an end plug 15-1. The EMs 15-3 is formed by mixing two or more of aluminum powder, ammonium nitrate, ammonium perchlorate, copper oxide, polytetrafluoroethylene, and nickel powder.

The die in step 2 is mounted on the universal hydraulic press 36, liquid during the entire forming process is supplied by the external liquid supply equipment 39, and liquid in the liquid storage chamber 12 flows back into an effluent treatment system 38 through the drain interface 16, and then flows into the liquid supply equipment 39 after electrolysis, filtration, and deposition, so that the liquid in the liquid storage chamber 12 is gradually renewed and re-circulated.

The liquid supply equipment 39 in step 3 is filled with normal-temperature water and a volume of the water is the same as a volume of the liquid storage chamber 12. A parameter selection range of the high energy electric pulse forming system is: a discharge capacitance is 1-2000 μF, and a discharge voltage is 1-30 kV.

An energy release reaction process of the energetic rod 15 in step 7 is: the discharge capacitor bank 24 of the high energy electric pulse forming system is charged by a high-voltage charging power source 28 to the preset voltage, the discharge trigger signal source 22 is opened to control the auxiliary discharge gap 23 such that a high-energy pulse current flows into the metal wire 15-2 through the positive and negative electrodes, the metal wire 15-2 is short-circuited under the action of the high-energy pulse current and is instantaneously heated up, melted, and vaporized to generate nano-scale high-temperature plasma, and the plasma quickly enters gaps between particles of the EMs 15-3 to ignite and then trigger the EMs 15-3 to release energy. The metal wire 15-2 explodes and the EMs 15-3 quickly releases a large amount of energy and generates a powerful shock wave, and thermal energy to act on water. Because water is incompressible, after high kinetic energy is obtained, the high kinetic energy acts on the difficult-to-form metal plate 8 to complete plastic forming of the metal plate 8.

The metal plate 8 obtained in step 9 is not subjected to processes such as pre-heating treatment and subsequent shaping.

To overcome the disadvantages such as poor plasticity of the difficult-to-form metal sheet 8 at room temperature, the present disclosure provides the method for forming a metal plate 8 of EMs 15-3 driven by a high-energy electric pulse metal wire 15-2. Based on electrohydraulic forming, great improvements and innovations have been made. An impact load is applied to the metal plate 8 through an energy adding effect of explosion of the metal wire 15-2 and energy release of the EMs 15-3, thereby implementing high-rate deformation. According to the present disclosure, electrohydraulic forming is effectively combined with the EMs 15-3 to achieve energy level spanning, thereby reducing a discharge voltage of high energy electric pulse forming system 35 and prolonging a service life of the equipment. In addition, the difficult-to-form metal sheet 8 can be precisely formed at room temperature, so that intelligent manufacturing is easily realized. Therefore, the present disclosure has important theoretical significance and broad application prospects.

Embodiment 1

In this example, a material of a bulge 40 at a recessed area of an outer door handle of an automotive covering part is an advanced high-strength steel plate DP600 with a thickness of 1.0 mm, a maximum contour size of a deformed area is about 120 mm, a maximum height of the bulge 40 is 12 mm, a radius of a fillet is 2 mm, and a cross section is ellipsoidal. The EMs 15-3 in the energetic rod 15 is an energetic mixture made of aluminum powder with a particle size of 1-3 μm and ammonium nitrate with a particle size of 100-140 μm through mechanical mixing according to a ratio of (20-40%):(80-60%). The metal wire 15-2 is an aluminum wire with a diameter of 0.1-1.0 mm, the insulation tube is an organic glass tube with an inner diameter of 8 mm, a wall thickness of 1 mm, and a length of 35 mm, and a material of the end plug 15-1 is nylon. The energetic rod 15 is made of the above materials by combining A and B glues through glue sealing. Because the automobile covering part is a thin sheet, there are technical problems such as poor modeling of the fillet, and other forming processes are difficult to achieve. For large springback and precise modeling, parts formed in this method are well modeled. In this way, springback is small, and modeling clearance is 0.1 mm, so that the precision requirement is met.

Embodiment 2

A double-layer drawing box 41 of an aluminium alloy plate 8 of high-strength aerospace materials 2055 has a thickness of 3 mm and a maximum drawing depth of 20 mm. The sheet 8 has a length of 320 mm and a width of 280 mm A bottom section of a drawing deformation area is a rectangle with a size of 180 mm×160 mm, and a radius of a fillet is 6 mm A top section of the deformation area is 100 mm×100 mm, and a radius of the fillet is 3 mm. For the EMs 15-3 in the energetic rod 15, aluminum powder with a particle size of 1-3 μm and polytetrafluoroethylene (PTPE) with a particle size of 500 nm are simply mixed according to a ratio of (30-50%):(70-50%), mechanically alloyed on a ball mill, then placed in a vacuum drying box at 40° C. for 30 minutes, and finally produced an energetic mixture. The metal wire 15-2 is a copper wire with a diameter of 0.1-0.8 mm, the insulation tube is an organic glass tube with an inner diameter of 10 mm, a wall thickness of 1 mm, and a length of 60 mm, and the end plug 15-1 is nylon. The energetic rod 15 is made of the above materials by combining A and B glues for testing. In traditional high-rate forming methods such as electromagnetic forming, efficiency is low and springback is large. In electrohydraulic forming, energy is low, and a forming effect is poor, thereby making it difficult to die parts due to insufficient energy. This method can greatly improve forming efficiency. Because discharge forming of the electric pulse-driven EMs 15-3 can achieve high-rate forming and has high energy, a forming limit is increased and springback is reduced to meet dying precision.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A method for forming a metal plate by using a high-energy electric pulse to drive energetic materials (EMs), applied to a device for forming the metal plate by using the high-energy electric pulse to drive the EMs, the device comprising:

an upper die;

a lower die; and a high energy electric pulse forming system, wherein the upper die comprises an upper die plate, a concave mold, and a die fixing plate, the lower die comprises a lower die plate, a liquid storage chamber, and a liquid chamber fixing plate, the concave mold is fixed on the upper die plate through the die fixing plate, and the concave mold is provided with an exhaust vent connected to an external vacuum pump; the liquid storage chamber is fixed on the liquid chamber fixing plate, the liquid chamber fixing plate is fixed on the lower die plate, a cross section of a side wall of the liquid storage chamber is circular, positive and negative electrodes are fixed and assembled on a first location and a second location of the side wall of the liquid storage chamber which are centrosymmetric, respectively; the liquid storage chamber is connected to a liquid supply equipment, and an energetic rod is arranged between the positive and negative electrodes, the positive and negative electrodes are connected to the high energy electric pulse forming system; and the upper die plate and the lower die plate are fitted and mounted through a guide sleeve and a guide post;

wherein the method comprises the following steps:

step 1: packing the EMs into an insulation tube, and sealing two ends of the insulation tube through gluing by an end plug to form the energetic rod; wherein a diameter of a metal wire in the energetic rod is 0.1-1.0 mm and an effective discharge length is 20-200 mm; and the EMs are formed by mixing two or more of aluminum powder, ammonium nitrate, ammonium perchlorate, copper oxide, polytetrafluoroethylene, and nickel powder; programming an robot arm to place the energetic rod between the positive and negative electrodes, wherein a pin-ball device at an electrode terminal of each of the positive and negative electrodes locks the metal wire at two ends of the energetic rod; and using the robot arm to clamp a metal plate and place the metal plate in the liquid storage chamber, wherein a first sealing ring is used between the metal plate and the liquid storage chamber for sealing;

step 2: fixing the liquid storage chamber on the liquid chamber fixing plate, and fixing the liquid chamber fixing plate on the lower die plate through a fastening bolt, fitting and mounting the upper die plate and the lower die plate through the guide sleeve and the guide post, and presetting a die clamping force for the upper die and the lower die by using a hydraulic press;

step 3: checking a first connection status between the external vacuum pump and the concave mold, checking a second connection status between a liquid filling interface and the liquid supply equipment, checking a third connection status between the high energy electric pulse forming system and positive electrode of the positive and negative electrodes, and checking a fourth connection status between the high energy electric pulse forming system and negative electrode of the positive and negative electrodes;

step 4: starting the external vacuum pump such that a forming concave mold cavity of the concave mold is in a certain vacuum state;

step 5: opening the liquid supply equipment to fill the liquid storage chamber with liquid through the liquid filling interface;

step 6: checking a fifth connection status of a line, and if the line is "on", performing electric discharging;

step 7: closing a charging switch such that a high-voltage charging power source charges a discharge capacitor bank through a high-voltage rectifier and a current limiting resistor, and after a preset voltage is reached, opening the charging switch, and opening a discharge trigger signal source to control an auxiliary discharge gap to discharge the energetic rod;

step 8: after the discharge is completed, opening a drain interface to recover the liquid; and step 9: starting the hydraulic press for separating the upper die and the lower die, and using the robot arm to pick, so as to form the entire plate.

2. A method for forming a metal plate by using a high-energy electric pulse to drive EMs, applied to the device for forming the metal plate by using the high-energy electric pulse to drive the EMs according to claim 1, comprising mounting the guide sleeve on the upper die plate through interference fit, mounting the guide post on the lower die plate through interference fit, fitting the guide sleeve mounted on the upper die plate with the guide post mounted on the lower die plate, and adopting clearance fit between the guide post and the guide sleeve.

3. A method for forming a metal plate by using a high-energy electric pulse to drive EMs, applied to the device for forming the metal plate by using the high-energy electric pulse to drive the EMs according to claim 1, comprising placing the metal plate in a recessed sub-port of the concave mold.

4. A method for forming a metal plate by using a high-energy electric pulse to drive EMs, applied to the device for forming the metal plate by using the high-energy electric pulse to drive the EMs according to claim 1, comprising mounting an insulation sleeve outside each of the positive and negative electrodes, and fixing the insulation sleeve in a threaded holes on a corresponding one of the first location and the second location of the liquid storage chamber through a threaded steel sleeve that is threadedly connected with the threaded hole, wherein the liquid storage chamber is in a stepped shape.

5. A method for forming a metal plate by using a high-energy electric pulse to drive EMs, applied to the device for forming the metal plate by using the high-energy electric pulse to drive the EMs according to claim 4, comprising providing a first sealing ring at a first contact area between the concave mold and the liquid storage chamber, providing a second sealing ring at a second contact area between the insulation sleeve and the threaded steel sleeve, and providing a third sealing ring at a third contact area between the insulation sleeve and the liquid storage chamber.

6. The method for forming a metal plate by using a high-energy electric pulse to drive the EMs according to claim 1, wherein step 2 further comprises:

mounting the upper die and the lower die on the hydraulic press, supplying liquid, in the form of water, during the entire forming process using the liquid supply equipment, wherein liquid in the liquid storage chamber is filtered by flowing into an effluent treatment system, through the drain interface, and then flows into the liquid supply equipment; and the liquid supply equipment in step 3 is filled with the liquid and a volume of the liquid is the same as a volume of the liquid storage chamber; and a parameter selection range of the high energy electric pulse forming system is: a discharge capacitance is 1-2000 µF, and a discharge voltage is 1-30 kV.

7. The method for forming a metal plate by using a high-energy electric pulse to drive the EMs according to claim 2, wherein step 2 further comprises: mounting the upper die and the lower die on the hydraulic press, supplying liquid, in the form of water, during the entire forming process using the liquid supply equipment, wherein liquid in the liquid storage chamber is filtered by flowing into an effluent treatment system, through the drain interface, and then flows into the liquid supply equipment; and the liquid supply equipment in step 3 is filled with the liquid and a volume of the liquid is the same as a volume of the liquid storage chamber; and a parameter selection range of the high energy electric pulse forming system is: a discharge capacitance is 1-2000 μF, and a discharge voltage is 1-30 kV.

8. The method for forming a metal plate by using a high-energy electric pulse to drive the EMs according to claim 3, wherein step 2 further comprises: mounting the upper die and the lower die on the hydraulic press, supplying liquid, in the form of water, during the entire forming process using the liquid supply equipment, wherein liquid in the liquid storage chamber is filtered by flowing into an effluent treatment system, through the drain interface, and then flows into the liquid supply equipment; and the liquid supply equipment in step 3 is filled with the liquid and a volume of the liquid is the same as a volume of the liquid storage chamber; and a parameter selection range of the high energy electric pulse forming system is: a discharge capacitance is 1-2000 μF, and a discharge voltage is 1-30 kV.

9. The method for forming a metal plate by using a high-energy electric pulse to drive the EMs according to claim 1, wherein step 7 further comprises:

charging the discharge capacitor bank to the preset voltage, opening the discharge trigger signal source to control the auxiliary discharge gap such that a high-energy pulse current flows into the metal wire through the positive and negative electrodes, the metal wire is charged with electricity under the action of the high-energy pulse current and is instantaneously heated up, melted, and vaporized to generate plasma, and the plasma quickly enters gaps between particles of the EMs to ignite and then trigger the EMs to release energy; the metal wire explodes and the EMs releases energy and generates a powerful shock wave, and thermal energy to act on the liquid, and after high kinetic energy is obtained, the high kinetic energy acts on the metal plate to complete plastic forming of the metal plate.

10. The method for forming a metal plate by using a high-energy electric pulse to drive the EMs according to claim 2, wherein step 7 further comprises:

charging the discharge capacitor bank to a preset voltage, opening the discharge trigger signal source to control the auxiliary discharge gap such that a high-energy pulse current flows into the metal wire through the positive and negative electrodes, the metal wire is charged with electricity under the action of the high-energy pulse current and is instantaneously heated up, melted, and vaporized to generate plasma, and the plasma quickly enters gaps between particles of the EMs to ignite and then trigger the EMs to release energy; the metal wire explodes and the EMs releases energy and generates a powerful shock wave, and thermal energy to act on the liquid, and after high kinetic energy is obtained, the high kinetic energy acts on the metal plate to complete plastic forming of the metal plate.

11. The method for forming a metal plate by using a high-energy electric pulse to drive the EMs according to claim 3, wherein step 7 further comprises:

charging is the discharge capacitor bank to a preset voltage, opening the discharge trigger signal source to control the auxiliary discharge gap such that a high-energy pulse current flows into the metal wire through the positive and negative electrodes, the metal wire is charged with electricity under the action of the high-energy pulse current and is instantaneously heated up, melted, and vaporized to generate plasma, and the plasma quickly enters gaps between particles of the EMs to ignite and then trigger the EMs to release energy; the metal wire explodes and the EMs releases energy and generates a powerful shock wave, and thermal energy to act on the liquid, and after high kinetic energy is obtained, the high kinetic energy acts on the metal plate to complete plastic forming of the metal plate.

* * * * *